(12) United States Patent
Briffaud et al.

(10) Patent No.: US 11,578,170 B2
(45) Date of Patent: Feb. 14, 2023

(54) THERMOPLASTIC COMPOSITION MADE FROM A POLYAMIDE POLYMER OBTAINED FROM A PREPOLYMER AND A CHAIN EXTENDER AND MANUFACTURING METHOD

(71) Applicant: ARKEMA FRANCE, Colombes (FR)

(72) Inventors: Thierry Briffaud, Caorches Saint Nicolas (FR); Gilles Hochstetter, L'hay les Roses (FR); Mathieu Capelot, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 1215 days.

(21) Appl. No.: 15/304,589

(22) PCT Filed: Apr. 14, 2015

(86) PCT No.: PCT/FR2015/050999
§ 371 (c)(1),
(2) Date: Oct. 17, 2016

(87) PCT Pub. No.: WO2015/159016
PCT Pub. Date: Oct. 22, 2015

(65) Prior Publication Data
US 2017/0037185 A1 Feb. 9, 2017

(30) Foreign Application Priority Data
Apr. 15, 2014 (FR) ...................... 1453359

(51) Int. Cl.
| | |
|---|---|
| *C08G 69/26* | (2006.01) |
| *C08L 77/12* | (2006.01) |
| *B29C 70/06* | (2006.01) |
| *C08L 77/06* | (2006.01) |
| *C08J 5/04* | (2006.01) |
| *B29C 45/00* | (2006.01) |
| *B29K 77/00* | (2006.01) |
| *B29L 7/00* | (2006.01) |

(52) U.S. Cl.
CPC ........ *C08G 69/265* (2013.01); *B29C 45/0005* (2013.01); *B29C 70/06* (2013.01); *C08J 5/04* (2013.01); *C08L 77/06* (2013.01); *C08L 77/12* (2013.01); *B29K 2077/00* (2013.01); *B29L 2007/002* (2013.01); *C08J 2377/06* (2013.01); *C08J 2377/12* (2013.01)

(58) Field of Classification Search
CPC ....... C08L 77/02; C08L 77/06; C08G 69/265; C08G 69/26
See application file for complete search history.

(56) References Cited

U.S. PATENT DOCUMENTS

| | | |
|---|---|---|
| 3,696,074 A | 10/1972 | Tsuda et al. |
| 4,927,583 A | 5/1990 | Lottiau et al. |
| 5,047,263 A | 9/1991 | Glemet |
| 5,138,021 A | 8/1992 | Judas et al. |
| 5,254,620 A | 10/1993 | Goetz et al. |
| 5,391,572 A | 2/1995 | Goetz et al. |
| 5,422,418 A | 6/1995 | Maj et al. |
| 5,665,855 A | 9/1997 | Acevedo et al. |
| 5,807,966 A | 9/1998 | Pfaendner et al. |
| 5,849,826 A * | 12/1998 | Ogo ..................... C08G 69/265 524/410 |
| 6,025,463 A | 2/2000 | Pfaendner et al. |
| 6,130,312 A | 10/2000 | Murakami et al. |

(Continued)

FOREIGN PATENT DOCUMENTS

| | | |
|---|---|---|
| CN | 102 234 373 A | 11/2011 |
| DE | 696 30 260 T1 | 7/2004 |

(Continued)

OTHER PUBLICATIONS

Lu et al (Chemical Modification of Polyamide-6 by Chain Extension with 2,20 -Bis(2-oxazoline), (Journal of Polymer Science: Part B: Polymer Physics, vol. 45, 1976-1982 (2007), published on Jul. 2007.*
U.S. Appl. No. 15/304,563, Thierry Briffaud, filed Oct. 17, 2016.
U.S. Appl. No. 15/304,620, Gilles Hochstetter, filed Oct. 17, 2016.
U.S. Appl. No. 15/304,657, Gilles Hochstetter, filed Oct. 17, 2016.
U.S. Appl. No. 15/304,676, Gilles Hochstetter, filed Oct. 17, 2016.
U.S. Appl. No. 15/667,211, Thierry Briffaud, filed Aug. 2, 2017.
Kroschwitz, Jacqueline I., Executive Editor, "Cycloaliphatic Amines", Kirk-Othmer Encyclopedia of Chemical Technology, 4th Edition, 1992, pp. 386-405, vol. 2, John Wiley & Sons, Inc., New York, USA (24 pages).
Chengxiang, Lu, et al., "Chemical Modification of Polyamide-6 by Chain Extension with 2,2'-Bis(2-oxazoline)," Journal of Polymer Science, Part B: Polymer Physics, Jan. 1, 2007, pp. 1976-1982, vol. 45, No. 15, Taylor & Francis Group, LLC, XP055163146.

(Continued)

*Primary Examiner* — Gregory Listvoyb
(74) *Attorney, Agent, or Firm* — Buchanan Ingersoll & Rooney P.C.

(57) ABSTRACT

A composition including at least one polyamide polymer obtained from at least one reactive polyamide prepolymer including at least one chain extender ($PA_1$-$All_1$-$PA_1$), the polyamide polymer being prepared at a temperature $T_1$ no lower than the temperature melting temperature or glass transition temperature of the polymer and having a mean molecular weight $Mn_1$. The composition has a melt viscosity which can be modulated according to the temperature to which the composition is exposed, wherein the temperature is between $T_2$ and $T_3$, $T_2$ and $T_3$ being higher than $T_1$, and the melt viscosity $\eta_2$ or $\eta'_3$ observed at the temperature $T_2$ or $T_3$, respectively, being lower than the melt viscosity $\eta_2$ or $\eta_3$ of the polyamide polymer, which does not include a chain extender and has the same mean molecular weight $Mn_1(PA_1)$ observed at the same temperature $T_2$ or $T_3$. The composition includes one or more polyamides.

14 Claims, 2 Drawing Sheets

(56) References Cited

U.S. PATENT DOCUMENTS

| | | |
|---|---|---|
| 7,592,558 B2 | 9/2009 | Lima |
| 7,892,455 B2 | 2/2011 | Bradley et al. |
| 7,927,710 B2 | 4/2011 | Hewel |
| 8,809,424 B2 | 8/2014 | Feron et al. |
| 8,871,862 B2 | 10/2014 | Pawlik et al. |
| 9,139,707 B2 | 9/2015 | Hochstetter |
| 9,752,029 B2 | 9/2017 | Briffaud et al. |
| 10,000,662 B2 | 6/2018 | Hochstetter |
| 2007/0148389 A1 | 6/2007 | Nishioka et al. |
| 2008/0020219 A1 | 1/2008 | Bouquerel et al. |
| 2008/0274355 A1 | 11/2008 | Hewel |
| 2009/0062452 A1 | 3/2009 | Harder et al. |
| 2009/0105392 A1 | 4/2009 | Yamauchi et al. |
| 2010/0215920 A1 | 8/2010 | Orange et al. |
| 2011/0052848 A1 | 3/2011 | Doshi et al. |
| 2011/0123749 A1 | 5/2011 | Hewel et al. |
| 2011/0241249 A1 | 10/2011 | Orange et al. |
| 2011/0306718 A1 | 12/2011 | Scherzer et al. |
| 2012/0022194 A1 | 1/2012 | Bayer et al. |
| 2012/0095161 A1 | 4/2012 | Pawlik et al. |
| 2012/0202896 A1 | 8/2012 | Blondel et al. |
| 2012/0321829 A1 | 12/2012 | Bayer et al. |
| 2013/0131269 A1 | 5/2013 | Below) et al. |
| 2013/0225770 A1 | 8/2013 | Jang et al. |
| 2013/0338260 A1 | 12/2013 | Center et al. |
| 2013/0338261 A1 | 12/2013 | Center et al. |
| 2014/0194570 A1 | 7/2014 | Kato et al. |
| 2014/0316063 A1 | 10/2014 | Hochstetter et al. |
| 2015/0126646 A1 | 5/2015 | Hochstetter et al. |
| 2015/0258742 A1 | 9/2015 | Hochstetter et al. |
| 2015/0267050 A1 | 9/2015 | Briffaud et al. |
| 2017/0037186 A1 | 2/2017 | Hochstetter et al. |
| 2017/0037199 A1 | 2/2017 | Hochstetter et al. |
| 2017/0037204 A1 | 2/2017 | Briffaud et al. |
| 2017/0037208 A1 | 2/2017 | Hochstetter et al. |
| 2017/0044317 A1 | 2/2017 | Briffaud et al. |
| 2017/0335107 A1 | 11/2017 | Briffaud et al. |
| 2018/0223057 A1 | 8/2018 | Capelot et al. |

FOREIGN PATENT DOCUMENTS

| | | |
|---|---|---|
| EP | 0 201 367 A1 | 11/1986 |
| EP | 0 261 020 A1 | 3/1988 |
| EP | 0 425 341 A1 | 5/1991 |
| EP | 0 471 566 A1 | 2/1992 |
| EP | 0 550 314 A1 | 7/1993 |
| EP | 0 581 641 A1 | 2/1994 |
| EP | 0 581 642 A1 | 2/1994 |
| EP | 0 739 924 A1 | 10/1996 |
| EP | 1 266 930 A1 | 12/2002 |
| EP | 1 741 553 A1 | 1/2007 |
| EP | 1 988 113 A1 | 11/2008 |
| EP | 2 325 260 A1 | 5/2011 |
| EP | 2 386 397 A1 | 11/2011 |
| EP | 2 535 365 A1 | 12/2012 |
| EP | 2 586 585 A1 | 5/2013 |
| FR | 2 603 891 A1 | 3/1988 |
| FR | 2 936 441 A1 | 4/2010 |
| FR | 2 958 296 A1 | 10/2011 |
| FR | 2 997 036 A1 | 4/2014 |
| FR | 2 997 089 A1 | 4/2014 |
| JP | 2000-504762 A | 4/2000 |
| JP | 2006-274061 A | 10/2006 |
| KR | 2008 0032357 A | 4/2008 |
| WO | WO 03/014198 A1 | 2/2003 |
| WO | WO 2005/061209 A1 | 7/2005 |
| WO | WO 2011/003973 A2 | 1/2011 |
| WO | WO 2011/015790 A2 | 2/2011 |
| WO | WO 2013/024593 A | 2/2013 |
| WO | WO 2013/060976 A1 | 5/2013 |
| WO | WO 2013/178955 A1 | 12/2013 |
| WO | WO 2014/064375 A1 | 5/2014 |
| WO | WO 2014/064377 A1 | 5/2014 |
| WO | WO 2015/159015 A1 | 10/2015 |

OTHER PUBLICATIONS

Koubaa, et al., "Thermoplastic pultrusion process: Modeling and optimal conditions for fibers impregnation," Journal of Reinforced Plastics & Composites, 32(17):1285-94 (2013).

Xanthos, Marino, "Reactive Extrusion: Principles and Practice", 1999, 8 pages including p. 177 (Chinese and English-language translation), ISBN 7-5025-2140-2, English-language translation published by Chemical Industry Press, Beijing, English version by Hanser Publishers 1992.

International Search Report (PCT/ISA/210) dated Jun. 25, 2015, by the European Patent Office as the International Searching Authority for International Application No. PCT/FR2015/050999.

Written Opinion (PCT/ISA/237) dated Jun. 25, 2015, by the European Patent Office as the International Searching Authority for International Application No. PCT/FR2015/050999.

J.G. Dolden, "Structure-property relationships in amorphous polyamides," Polymer, Oct. 1976, pp. 875-892, vol. 17, Elsevier Science Publishers B.V., Great Britain.

Chengxiang Lu et al., "Chain Extension of Polyamide 6 Using Bisoxazoline Coupling Agents," Journal of Macromolecular Science, Part B: Physics, Jan. 2008, pp. 986-999, vol. 47, Taylor & Francis Group, LLC.

\* cited by examiner

THERMOPLASTIC COMPOSITION MADE FROM A POLYAMIDE POLYMER OBTAINED FROM A PREPOLYMER AND A CHAIN EXTENDER AND MANUFACTURING METHOD

The invention relates to a composition comprising at least one polyamide polymer derived from at least one reactive polyamide prepolymer comprising at least one chain extender, said composition having a melt viscosity which can be modulated according to the temperature to which said composition is subjected.

The invention also covers the polyamide polymer derived from said polyamide prepolymer with chain extender.

The invention also covers the use of a polyamide polymer derived from said prepolymer with said chain extender, for modulating the melt viscosity of a composition comprising said polyamide polymer and also the use of said composition for extrusion, injection-molding or molding and in particular for easier impregnation of reinforcing fibers for the manufacture of composite.

The invention also covers a process for manufacturing said composition, a process for manufacturing a composite material, in particular mechanical parts or structural parts based on said material, by means of said composition, and the use of the composition of the invention for composite material parts and also the composite part which results therefrom and for applications in the motor vehicle, electrical and electronics, railway, marine, road transport, wind power, sport, aeronautical and aerospace, construction, panel and leisure fields.

EP 0 261 020 describes the use of reactive semicrystalline prepolymers based on PA 6, 11 and 12 for the manufacture of a thermoplastic composite by means of a pultrusion process. The prepolymers of aliphatic structure as described insufficient hot mechanical performance levels and are free of chain extender.

EP 1 988 113 describes a molding composition free of chain extender based on a 10T/6T copolyamide with:
40 to 95 mol % of 10T
5 to 40 mol % of 6T.

EP 0 581 642 describes polymers resulting from the addition of dicarboxy-terminated oligomers to bisoxazines or bisoxazolines, of which the viscosity of a given solution in meta-cresol at 30° C. at concentrations of 0.5 g/dl is less than 0.5 dl g$^{-1}$, but does not specify any melt viscosity.

US 2011306718 describes a process for the pultrusion of low-Tg reactive aliphatic polyamides combined with chain extenders having a polymeric structure bearing several (and indeed more than 2) anhydride or epoxyide functions. This document describes no non-polymeric extender. The chain extender is added during the impregnation of the fibers.

CN 102 234 373 describes a process for preparing biodegradable polyesteramides by chain extension.

KR 2008 0032357 describes a process for increasing the molecular weight of nylon using blocked diisocyanates as chain extender.

EP 2 586 585 describes thermoplastic composite materials having a Tg greater than or equal to 80° C., reinforced with synthetic fibers.

The use of compositions for obtaining good mechanical properties requires having available polymers, in particular polyamide, with high average molecular weights Mn. However, in the context of molding, the use of said polymers also requires an increased fluidity, i.e. a lower viscosity. It is thus necessary to increase the processing temperature in order to increase the fluidity, thereby causing degradation of said polymer.

The drawbacks of the prior art, with the absence of a good compromise between mechanical performance levels and processing capacity (ease of transformation) at lower temperature with a shorter production cycle time are overcome by the solution of the present invention, which targets compositions, comprising at least one polyamide polymer derived from at least one reactive polyamide prepolymer comprising at least one chain extender ($PA_1$-$All_1$-$PA_1$), said polyamide polymer being prepared at a temperature $T_1$ greater than or equal to the temperature $T_m$ or $T_g$ of said polymer and having an average molecular weight $Mn_1$, characterized in that said composition has a melt viscosity which can be modulated according to the temperature to which said composition is subjected,
said temperature being included from $T_2$ to $T_3$, $T_2$ and $T_3$ being greater than $T_1$,
and said melt viscosity $\eta'_2$ or $\eta'_3$ observed respectively at the temperature $T_2$ or $T_3$ being less than the melt viscosity $\eta_2$ or $\eta_3$ of said polyamide polymer, free of chain extender and having the same average molecular weight $Mn_1$ ($PA_1$) observed at the same temperature $T_2$ or $T_3$,
allowing easier processing at lower temperatures for the same average molecular weight of polymer with savings regarding the overall energy balance of the processing process, a shorter production cycle time and an improved productivity, through an ability for rapid crystallization of said polyamide polymer and while maintaining the mechanical performance levels of said final materials at a high level, and modulation of the processing temperature for the same polyamide polymer derived from at least one reactive polyamide prepolymer comprising at least one chain extender according to the use and the applications desired for said polyamide polymer.

Consequently, the first subject of the invention relates to a composition, comprising at least one polyamide polymer derived from at least one reactive polyamide prepolymer comprising at least one chain extender ($PA_1$-$All_1$-$PA_1$), said polyamide polymer being prepared at a temperature $T_1$ greater than or equal to the temperature $T_m$ or $T_g$ of said polymer and having an average molecular weight $Mn_1$, characterized in that said composition has a melt viscosity which can be modulated according to the temperature to which said composition is subjected,
said temperature being included from $T_2$ to $T_3$, $T_2$ and $T_3$ being greater than $T_1$,
and said melt viscosity $\eta'_2$ or $\eta'_3$ observed respectively at the temperature $T_2$ or $T_3$ being less than the melt viscosity $\eta_2$ or $\eta_3$ of said polyamide polymer, free of chain extender and having the same average molecular weight $Mn_1$ ($PA_1$) observed at the same temperature $T_2$ or $T_3$.

Said composition is based on a polyamide polymer derived from at least one polyamide prepolymer comprising or consisting of at least one unit of amide A with the optional presence of at least one second unit of amide B different than A and optionally of at least one third (C) amide unit, these units being different than one another, and of at least one chain extender.

A second subject of the invention relates to a polyamide polymer derived from said polyamide prepolymer to which a chain extender has been added, i.e. resulting from the polymerization of said polyamide prepolymer to which said chain extender has been added.

A third subject relates to the use of a polyamide polymer with a chain extender, derived from said prepolymer with said chain extender, for modulating the melt viscosity of a composition comprising said polyamide polymer and also the use of said composition for extrusion, injection-molding or molding and in particular for easier impregnation of reinforcing fibers for the manufacture of composite.

A fourth subject of the invention relates to a process for manufacturing said composition.

Another subject of the invention relates to a process for manufacturing a thermoplastic composite material and more particularly for manufacturing mechanical parts or structural parts based on said composite material.

Another subject of the invention relates to the use of the specific composition of PA of the invention for manufacturing a thermoplastic composite material of the same composition and more particularly mechanical or structural parts based on this material.

Another subject of the invention relates to the thermoplastic composite material which results from said composition for composite material.

Finally, the invention covers a mechanical part or structural part based on composite material obtained by means of the specific process of the invention or which results from the use of the specific composition of PA of the invention. Consequently, the first subject relates to a composition, comprising at least one polyamide polymer derived from at least one reactive polyamide prepolymer comprising at least one chain extender ($PA_1$-$All_1$-$PA_1$), said polyamide polymer being prepared at a temperature $T_1$ greater than or equal to the temperature $T_m$ or $T_g$ of said polymer and having an average molecular weight $Mn_1$, characterized in that said composition has a melt viscosity which can be modulated according to the temperature to which said composition is subjected, said temperature being included from $T_2$ to $T_3$, $T_2$ and $T_3$ being greater than $T_1$, and said melt viscosity $\eta'_2$ or $\eta'_3$ observed respectively at the temperature $T_2$ or $T_3$ being less than the melt viscosity $\eta_2$ or $\eta_3$ of said polyamide polymer, free of chain extender and having the same average molecular weight $Mn_1$ ($PA_1$) observed at the same temperature $T_2$ or $T_3$, and with:

said composition comprising or consisting of one or more polyamides, including random or block copolyamides which are polymers and which comprise different amide units of formula $A/(B)_r/(C)_s$, selected as follows:

A: is a repeating amide unit chosen from lactams or an amino acid of $C_6$-$C_{14}$, an amide unit X.Y in which X represents at least one diamine, said diamine being chosen from a linear or branched aliphatic diamine, a cycloaliphatic diamine and an aromatic diamine or a mixture thereof, and Y represents at least one dicarboxylic acid, said diacid being chosen from:
an aliphatic diacid, a cycloaliphatic diacid and an aromatic diacid,
said diamine and said diacid comprising from 4 to 36 carbon atoms, advantageously from 6 to 18 carbon atoms;

B and C: are repeating amide units different than A, optionally present depending on the value of r and s, r=0 or 1, s=0 or 1, said amides units B and C being chosen from the same constituents as for A, on the condition that when r and s=1, then B and C are different,
the sum of the units A+B+C being equal to 100% by weight.

The sum of the molar contents in the absence of C amounts to A+B=100%, with A and B making it up to 100%.

In the absence of B and C, the molar content of A is 100%. Said composition is free of reinforcing fibers and also of polymeric chain extender.

The temperature $T_m$ denotes the melting temperature of a semicrystalline polyamide and $T_g$ denotes the glass transition temperature of an amorphous polyamide.

The expression "average molecular weight Mn" is intended to mean the number-average molecular weight Mn, in particular determined by size exclusion chromatography.

($PA_1$-$All_1$-$PA_1$) denotes the polyamide polymer comprising a reactive polyamide prepolymer comprising at least one chain extender. Said polyamide polymer may also be of formula ($All_1$-$PA_1$-$All_1$-$PA_1$-$All_1$) or ($All_1$-$PA_1$-$All_1$-$PA_1$), i.e. with at least one chain extender in the terminal position.

Advantageously, the melt viscosity ratio $\eta'_3/\eta_3$ observed at a temperature $T_3$ is less than the melt ratio $\eta'_2/\eta_2$ observed at a temperature $T_2$, $T_3 \geq T_2+10°$ C.

Advantageously, the melt viscosity ratio $\eta'_3/\eta_3$ observed at a temperature $T_3$ is greater than the melt ratio $\eta'_2/\eta_2$ observed at a temperature $T_2$, $T_3 \leq T_2-10°$ C.

Advantageously, the composition of the invention comprises or consists of at least one polyamide polymer derived from a polyamide prepolymer comprising at least one chain extender.

Advantageously, at least one prepolymer is present and a single chain extender is present.

Advantageously, a single prepolymer is present and at least one chain extender is present.

Advantageously, a single prepolymer is present and a single chain extender is present.

Advantageously, said polyamide polymer, when it is the only one present, comprises or consists of a single prepolymer and a single chain extender.

The term "Which can be modulated" means that the melt viscosity of the composition is variable according to the temperature to which said composition is subjected.

The inventors have therefore found, unexpectedly, that a composition comprising or consisting of:

a polyamide polymer derived from at least one reactive polyamide prepolymer on which at least one chain extender is present (also called in the description: polyamide polymer with chain extender or polyamide polymer with extender), i.e. resulting from the polymerization of said at least one polyamide prepolymer on which at least one chain extender is present, has not only a melt viscosity which can be modulated according to the temperature to which it is subjected, but also melt viscosities which are lower compared with the melt viscosity of the same polyamide polymer having the same molecular weight, but free of chain extender (also called in the description: polyamide polymer without chain extender or polyamide polymer without extender).

In other words:

either a polyamide polymer with a chain extender ($PA_1$-$All_1$-$PA1$) having an average Mn equal to $Mn_1$, or a polyamide polymer ($PA_1$) without chain extender having the same $Mn_1$, said $PA_1$-$All_1$-$PA_1$ and $PA_1$ being prepared at any temperature T greater than or equal to $T_m$ or $T_g$, if said $PA_1$-$All_1$-$PA_1$ and $PA_1$ are subjected to two different temperatures $T_2$ and $T_3$, and $T_2$ and $T_3$ being greater than $T_1$, it is well known to those skilled in the art that the melt viscosities $\eta_2$ of $PA_1$ and $\eta_3$ of $PA_1$ obtained for respective temperatures $T_2$ and $T_3$ will be different, as will the melt viscosities $\eta'_2$ of $PA_1$-$All_1$-$PA_1$ and $\eta'_3$ of $PA_1$-$All_1$-$PA_1$ obtained for the respective temperatures $T_2$ and $T_3$.

However, entirely unexpectedly, the inventors have found that $\eta'_2$ is also less than $\eta_2$, just as $\eta'_3$ is less than $\eta_3$ although the average $Mn_1$ are identical.

In other words, the viscosity of $PA_1$-$All_1$-$PA_1$ is identical to that of $PA_1$ but at a lower temperature.

The expression "$PA_1$-$All_1$-$PA_1$" means that the chain extender is necessarily covalently integrated into the chain of the polyamide polymer and is not in the terminal position of the polyamide polymer.

Furthermore, the inventors have also found that the ratios of viscosities obtained between a composition comprising or consisting of a polyamide polymer free of chain extender and a composition comprising or consisting of a polyamide polymer with chain extender, at two different temperatures, are not constant.

In other words, $\eta'_2/\eta_2 \neq \eta'_3/\eta_3$ and depends on the temperature. Thus, $\eta'_2/\eta_2 > \eta'_3/\eta_3$ for $T_3 \geq T_2+10°$ C. and $\eta'_2/\eta_2 < \eta'_3/\eta_3$ for $T_3 \leq T_2-10°$ C.

FIG. 1 summarizes these various properties.

Advantageously, when $T_3 \geq T_2+10°$ C., then $T_3$ is at most 350° C., in particular at most 320° C., particularly at most 300° C.

When $T_3 \leq T_2-10°$ C., then $T_2$ is at most 360° C., in particular at most 330° C., particularly at most 310° C.

This difference in viscosity obtained between said polyamide polymer with or without chain extender at the same temperature has the following advantages:
1) use of the composition comprising or consisting of a polyamide polymer with extender easier than use of that comprising or consisting of a polyamide polymer without extender and in particular at a lower temperature than the processing temperature of the polyamide without chain extender having the same average Mn;
2) possibility of obtaining compositions comprising or consisting of the same polyamide polymer with extender but having different melt viscosities and which can be used without distinction for extrusion, injection-molding or molding, for varied applications, and allowing in particular easier impregnation of reinforcing fibers for the manufacture of composite materials, in particular mechanical or structural parts based on said material.

As Regards the Constituents (A), (B) and (C):

Aliphatic Repeating Amide Unit

In a first variant of the invention, the aliphatic amide unit A, B or C is obtained from an aminocarboxylic acid comprising from 6 to 14 carbon atoms. It can thus be chosen from 9-aminononanoic acid (denoted 9), 10-aminodecanoic acid (denoted 10), 11-aminoundecanoic acid (denoted 11) and 12-aminododecanoic acid (denoted 12); advantageously, the aminocarboxylic acid is 11-aminoundecanoic acid.

In a second variant of the invention, the aliphatic repeating unit A, B or C is obtained from a lactam comprising from 6 to 14 carbon atoms. It can thus be chosen from caprolactam (denoted 6), decanolactam (denoted 10), undecanolactam (denoted 11) and laurolactam or lauryllactam (denoted 12); advantageously, the lactam is undecanolactam.

More particularly preferably, the repeating unit A is obtained from a single aminocarboxylic acid or a single lactam. Nonetheless, it is entirely possible to envision using, to obtain this same unit A, a mixture of two or more aminocarboxylic acids, a mixture of two or more lactams, but also a mixture of one, two or more aminocarboxylic acids with one, two or more lactams.

Repeating Unit A, B or C of X.Y Type

The repeating unit X.Y is a unit obtained from the polycondensation of at least one linear aliphatic diamine, or of at least one cycloaliphatic diamine or of at least one aromatic diamine or of a mixture of two or more thereof and of at least one aliphatic dicarboxylic acid or of at least one cycloaliphatic dicarboxylic acid or of at least one aromatic dicarboxylic acid.

The molar proportions of diamine and of dicarboxylic acid are preferentially stoichiometric.

The diamine and also the dicarboxylic acid each comprise from 4 to 36 carbon atoms and, advantageously, from 6 to 18 carbon atoms.

The aliphatic diamine used to obtain this repeating unit X.Y is an aliphatic diamine which has a linear main chain comprising at least 4 carbon atoms.

This linear main chain can, where appropriate, comprise one or more methyl and/or ethyl substituents; in said configuration, the term "branched aliphatic diamine" is used. In the case where the main chain comprises no substitute, the aliphatic diamine is termed "linear aliphatic diamine".

Whether or not it comprises methyl and/or ethyl substituents on the main chain, the aliphatic diamine used to obtain this repeating unit X.Y comprises from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then corresponds to the formula $H_2N$—$(CH_2)_x$—$NH_2$ and can be chosen for example from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecanediamine and octadecenediamine. The linear aliphatic diamines that have just been mentioned may all be biobased within the meaning of standard ASTM D6866.

When this diamine is a branched aliphatic diamine, it can in particular be methyl-2 pentanediamine or 2-methyl-1,8-octanediamine.

The cycloaliphatic diamine can be chosen for example from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane or 3'-dimethyl-4,4'-diaminodicyclohexylmethane commonly called "BMACM" or "MACM" (and denoted B hereinafter) p-bis(aminocyclohexyl)methane commonly called "PACM" (and denoted P hereinafter), isopropylidenedi(cyclohexylamine) commonly called "PACP", isophoronediamine (denoted IPD hereinafter) and 2,6-bis(aminomethyl)norbornane commonly called "BAMN".

A nonexhaustive list of these cycloaliphatic diamines is given in the publication "Cycloaliphatic Amines" (Encyclopaedia of Chemical Technology, Kirk-Othmer, 4th Edition (1992), pp. 386-405).

The aromatic diamine can be chosen from 1,3-xylylenediamine and 1,4-xylylenediamine. The dicarboxylic acid can be chosen from linear or branched aliphatic dicarboxylic acids, cycloaliphatic dicarboxylic acids and aromatic dicarboxylic acids.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and fatty acid dimers containing 36 carbons.

The fatty acid dimers mentioned above are dimerized fatty acids obtained by oligomerization or polymerization of unsaturated monobasic fatty acids bearing a long hydrocarbon-based chain (such as linoleic acid and oleic acid), as described in particular in document EP 0 471 566.

When the dicarboxylic acid is cycloaliphatic, it may comprise the following carbon backbones: norbornylmethane, cyclohexane, cyclohexylmethane, dicyclohexylmethane, dicyclohexylpropane, di(methylcyclohexyl) or di(methylcyclohexyl)propane.

When the dicarboxylic acid is aromatic, it can be chosen from terephthalic acid (denoted T), isophthalic acid (denoted I) and a naphthalenic acid.

According to one advantageous embodiment of the invention, A is an amide unit present in a molar content of 100%, and represents an aliphatic repeating unit obtained from a lactam or an amino acid, in particular chosen from PA6, PA11 and PA12.

According to one advantageous embodiment of the invention, A is an amide unit present in a molar content of 100%, and represents a repeating amide unit X.Y, in particular chosen from PA6.6, PA6.10, PA6.12, PA10.10 and 10.12.

According to one advantageous embodiment of the invention, A represents an amide unit present in a molar content ranging from 1% to 99%, B is an amide unit different than A, said unit B being present in a molar content ranging from 1% to 99%, and C is an optional amide unit different than A and than B and as defined above.

Advantageously:
A: is a major amide unit present in a molar content ranging from 55% to 95%, preferably from 55% to 85%, more preferentially from 55% to 80%, chosen from x.T units, where x is a linear aliphatic $C_4$ to $C_{18}$ diamine, preferably chosen from $C_6$, $C_9$, $C_{10}$, $C_{11}$ and $C_{12}$ and where T is terephthalic acid, B: is an amide unit different than A, said unit B being present in a molar content ranging from 5% to 45%, preferably from 15% to 45%, more preferentially from 20% to 45%, depending on the Tm of the polyamide based on unit A, and said amide unit B is chosen from an aliphatic repeating unit obtained from a lactam or an amino acid, in particular chosen from PA6, PA11 and PA 12 or a repeating amide unit X.Y, in particular chosen from PA6.6, PA6.10, PA6.12, PA10.10 and 10.12.

More advantageously,
A: is a major amide unit present in a molar content ranging from 55% to 95%, preferably from 55% to 85%, more preferentially from 55% to 80%, even more preferentially from 55% to 75%, in particular from 56% to 70%, chosen from x.T units, where x is a linear aliphatic $C_4$ to $C_{18}$, preferably $C_6$, $C_9$, $C_{10}$, $C_{11}$ or $C_{12}$, diamine and where T is terephthalic acid, B: is an amide unit different than A, said unit B being present in a molar content ranging from 5% to 45%, preferably from 15% to 45%, more preferentially from 20% to 45%, even more preferentially from 25% to 45%, in particular from 30% to 45%, depending on the Tm of the polyamide based on unit A and with said amide unit B being chosen from x'.T units where x' is chosen from:
B1) a branched aliphatic diamine bearing a single methyl or ethyl, preferably methyl, branch (branching meaning the same thing), in particular 2-methylpentamethylenediamine (MPMD) or 2-methyloctamethylenediamine (MOMD), and having a main chain length different by at least two carbon atoms compared with the main chain length of the diamine x of said associated unit A, preferably x' (according to B1)) being MPMD or
B2) m-xylylenediamine (MXD) or
B3) a linear aliphatic $C_4$ to $C_{18}$ diamine, preferably with a difference of at least two carbon atoms between the chain of diamine x of said unit A and the chain of diamine x' of said unit B, and preferably, said unit B is chosen from x'.T units, where x' is MPMD according to option B1) or MXD according to option B2) or a linear aliphatic diamine as defined above according to option B3) or more preferentially x' is MPMD according to B1) or MXD according to B2) and even more preferentially x' is MXD according to B2), C: optional amide unit different than A and than B as defined above, and under the condition that the sum of the molar contents A+B+C is equal to 100%.

According to a first possibility, in said composition of the invention, said polyamide polymer comprises said amide unit according to C, different than A and than B, where the unit C as defined above is present. C can be present in a molar content ranging up to 30%, preferably up to 25%, preferably up to 20%, more preferentially up to 15%, relative to the total molar content of the polyamide.

When the unit C is present and corresponds to x'T with x' as defined above for the unit B, in this case C being different than B by definition, said unit C can be based on x' which is defined according to B1 and in this case, said unit B may have x' defined according to either B2 or B3. If C is based on x' according to B2, in this case the unit B may be based on x' which is according to B1 or B3. If C is based on x' according to B3, in this case the unit B may be based on x' which is defined according to B1 or B2.

More particularly, in this unit C of said composition, said aromatic structure may be chosen for example from the isophthalic and/or naphthalenic structure. A terephthalic structure is possible in particular for the diacid component when the diamine is cycloaliphatic. Said cycloaliphatic structure may be chosen from a structure based on a cyclohexane ring or a structure based on a decahydronaphthalenic ring (hydrogenated naphthalenic structure).

Preferably, the structure of C is derived from an aliphatic diamine and from a cycloaliphatic and/or aromatic diacid, for example as defined above, or from a diacid and from a cycloaliphatic diamine, for example as defined above. More particularly, said unit C is chosen from the units derived:
from a cycloaliphatic diamine and from terephthalic acid or
from a diacid chosen from isophthalic acid and naphthenic acid or based on cyclohexane and on a diamine x or x' as defined above for the units A and B respectively.

According to another variant of the composition of the invention, said unit C is present in a molar content that can range up to 70%, in particular up to 40%, in particular up to 30%, preferably up to 20%, relative to the total molar content of the polyamide. Thus, according to this variant, said composition comprises said unit C as defined above, in particular chosen from: $C_6$ to $C_{12}$, preferably $C_6$, $C_{11}$ and $C_{12}$, amino acids or lactams, or mixtures thereof, or units derived from the reaction of a $C_6$ to $C_{18}$, preferably $C_6$ to $C_{12}$, linear aliphatic diacid and of a $C_6$ to $C_{18}$, preferably $C_6$ to $C_{12}$, linear aliphatic diamine, and preferably with the units A and B being respectively based on the diamines x and x' as defined above.

Preferably, the unit C, when it is present, is in a molar content of less than 40% relative to the total molar content of the polyamide as defined according to the invention.

Preferably, said amide unit A, as defined according to the invention above and below, is present in a molar content ranging from 55% to 80%, more preferentially from 55% to 75%, even more preferentially from 55% to 70%, relative to all of the units of said polyamide polymer as defined above according to the invention.

Advantageously, the composition comprises or consists of the units A in a proportion of from 55% to 95% and B in a proportion of from 5% to 45%, the sum of the molar contents of A+B being equal to 100%.

Advantageously, the composition comprises or consists of the units A in a proportion of from 55% to 95% and B in a proportion of from 15% to 45%, the sum of the molar contents of A+B being equal to 100%.

Advantageously, the composition comprises or consists of the units A in a proportion of from 55% to 95% and B in a proportion of from 20% to 45%, the sum of the molar contents of A+B being equal to 100%.

Advantageously, the composition comprises or consists of the units A in a proportion of from 55% to 95% and B in a proportion of from 25% to 45%, the sum of the molar contents of A+B being equal to 100%.

Advantageously, the composition comprises or consists of the units A in a proportion of from 55% to 95% and B in a proportion of from 30% to 45%, the sum of the molar contents of A+B being equal to 100%.

Advantageously, the composition comprises or consists of the units A in a proportion of from 55% to 85% and B in a proportion of from 5% to 45%, the sum of the molar contents of A+B being equal to 100%.

Advantageously, the composition comprises or consists of the units A in a proportion of from 55% to 85% and B in a proportion of from 15% to 45%, the sum of the molar contents of A+B being equal to 100%.

Advantageously, the composition comprises or consists of the units A in a proportion of from 55% to 85% and B in a proportion of from 20% to 45%, the sum of the molar contents of A+B being equal to 100%.

Advantageously, the composition comprises or consists of the units A in a proportion of from 55% to 85% and B in a proportion of from 25% to 45%, the sum of the molar contents of A+B being equal to 100%.

Advantageously, the composition comprises or consists of the units A in a proportion of from 55% to 85% and B in a proportion of from 30% to 45%, the sum of the molar contents of A+B being equal to 100%.

Advantageously, the composition comprises or consists of the units A in a proportion of from 55% to 80% and B in a proportion of from 5% to 45%, the sum of the molar contents of A+B being equal to 100%.

Advantageously, the composition comprises or consists of the units A in a proportion of from 55% to 80% and B in a proportion of from 15% to 45%, the sum of the molar contents of A+B being equal to 100%.

Advantageously, the composition comprises or consists of the units A in a proportion of from 55% to 80% and B in a proportion of from 20% to 45%, the sum of the molar contents of A+B being equal to 100%.

Advantageously, the composition comprises or consists of the units A in a proportion of from 55% to 80% and B in a proportion of from 25% to 45%, the sum of the molar contents of A+B being equal to 100%.

Advantageously, the composition comprises or consists of the units A in a proportion of from 55% to 80% and B in a proportion of from 30% to 45%, the sum of the molar contents of A+B being equal to 100%.

Advantageously, the composition comprises or consists of the units A in a proportion of from 55% to 75% and B in a proportion of from 5% to 45%, the sum of the molar contents of A+B being equal to 100%.

Advantageously, the composition comprises or consists of the units A in a proportion of from 55% to 75% and B in a proportion of from 15% to 45%, the sum of the molar contents of A+B being equal to 100%.

Advantageously, the composition comprises or consists of the units A in a proportion of from 55% to 75% and B in a proportion of from 20% to 45%, the sum of the molar contents of A+B being equal to 100%.

Advantageously, the composition comprises or consists of the units A in a proportion of from 55% to 75% and B in a proportion of from 25% to 45%, the sum of the molar contents of A+B being equal to 100%.

Advantageously, the composition comprises or consists of the units A in a proportion of from 55% to 75% and B in a proportion of from 30% to 45%, the sum of the molar contents of A+B being equal to 100%.

Advantageously, the composition comprises or consists of the units A in a proportion of from 55% to 70% and B in a proportion of from 5% to 45%, the sum of the molar contents of A+B being equal to 100%.

Advantageously, the composition comprises or consists of the units A in a proportion of from 55% to 70% and B in a proportion of from 15% to 45%, the sum of the molar contents of A+B being equal to 100%.

Advantageously, the composition comprises or consists of the units A in a proportion of from 55% to 70% and B in a proportion of from 20% to 45%, the sum of the molar contents of A+B being equal to 100%.

Advantageously, the composition comprises or consists of the units A in a proportion of from 55% to 70% and B in a proportion of from 25% to 45%, the sum of the molar contents of A+B being equal to 100%.

Advantageously, the composition comprises or consists of the units A in a proportion of from 55% to 70% and B in a proportion of from 30% to 45%, the sum of the molar contents of A+B being equal to 100%.

Advantageously, the composition comprises or consists of the units A in a proportion of from 55% to 95% and B in a proportion of from 5% to 45%, the sum of the molar contents of A+B being equal to 100%.

Advantageously, the composition comprises or consists of the units A in a proportion of from 55% to 95% and B in a proportion of from 15% to 45%, the sum of the molar contents of A+B being equal to 100%.

Advantageously, the composition comprises or consists of the units A in a proportion of from 55% to 95% and B in a proportion of from 20% to 45%, the sum of the molar contents of A+B being equal to 100%.

Advantageously, the composition comprises or consists of the units A in a proportion of from 55% to 95% and B in a proportion of from 25% to 45%, the sum of the molar contents of A+B being equal to 100%.

Advantageously, the composition comprises or consists of the units A in a proportion of from 55% to 95% and B in a proportion of from 30% to 45%, the sum of the molar contents of A+B being equal to 100%.

Advantageously, the composition comprises or consists of the units A in a proportion of from 55% to 85% and B in a proportion of from 5% to 45%, the sum of the molar contents of A+B being equal to 100%.

Advantageously, the composition comprises or consists of the units A in a proportion of from 55% to 85% and B in a proportion of from 15% to 45%, the sum of the molar contents of A+B being equal to 100%.

Advantageously, the composition comprises or consists of the units A in a proportion of from 55% to 85% and B in a proportion of from 20% to 45%, the sum of the molar contents of A+B being equal to 100%.

Advantageously, the composition comprises or consists of the units A in a proportion of from 55% to 85% and B in a proportion of from 25% to 45%, the sum of the molar contents of A+B being equal to 100%.

Advantageously, the composition comprises or consists of the units A in a proportion of from 55% to 85% and B in a proportion of from 30% to 45%, the sum of the molar contents of A+B being equal to 100%.

Advantageously, the composition comprises or consists of the units A in a proportion of from 55% to 80% and B in a proportion of from 5% to 45%, the sum of the molar contents of A+B being equal to 100%.

Advantageously, the composition comprises or consists of the units A in a proportion of from 55% to 80% and B in a proportion of from 15% to 45%, the sum of the molar contents of A+B being equal to 100%.

Advantageously, the composition comprises or consists of the units A in a proportion of from 55% to 80% and B in a proportion of from 20% to 45%, the sum of the molar contents of A+B being equal to 100%.

Advantageously, the composition comprises or consists of the units A in a proportion of from 55% to 80% and B in a proportion of from 25% to 45%, the sum of the molar contents of A+B being equal to 100%.

Advantageously, the composition comprises or consists of the units A in a proportion of from 55% to 80% and B in a proportion of from 30% to 45%, the sum of the molar contents of A+B being equal to 100%.

Advantageously, the composition comprises or consists of the units A in a proportion of from 55% to 75% and B in a proportion of from 5% to 45%, the sum of the molar contents of A+B being equal to 100%.

Advantageously, the composition comprises or consists of the units A in a proportion of from 55% to 75% and B in a proportion of from 15% to 45%, the sum of the molar contents of A+B being equal to 100%.

Advantageously, the composition comprises or consists of the units A in a proportion of from 55% to 75% and B in a proportion of from 20% to 45%, the sum of the molar contents of A+B being equal to 100%.

Advantageously, the composition comprises or consists of the units A in a proportion of from 55% to 75% and B in a proportion of from 25% to 45%, the sum of the molar contents of A+B being equal to 100%.

Advantageously, the composition comprises or consists of the units A in a proportion of from 55% to 75% and B in a proportion of from 30% to 45%, the sum of the molar contents of A+B being equal to 100%.

Advantageously, the composition comprises or consists of the units A in a proportion of from 55% to 70% and B in a proportion of from 5% to 45%, the sum of the molar contents of A+B being equal to 100%.

Advantageously, the composition comprises or consists of the units A in a proportion of from 55% to 70% and B in a proportion of from 15% to 45%, the sum of the molar contents of A+B being equal to 100%.

Advantageously, the composition comprises or consists of the units A in a proportion of from 55% to 70% and B in a proportion of from 20% to 45%, the sum of the molar contents of A+B being equal to 100%.

Advantageously, the composition comprises or consists of the units A in a proportion of from 55% to 70% and B in a proportion of from 25% to 45%, the sum of the molar contents of A+B being equal to 100%.

Advantageously, the composition comprises or consists of the units A in a proportion of from 55% to 70% and B in a proportion of from 30% to 45%, the sum of the molar contents of A+B being equal to 100%.

Advantageously, the compositions comprising or consisting of the units A and B, the sum of the molar contents of A+B being equal to 100%, defined above, also comprise a unit C in a molar content ranging up to 30%, relative to all of the units of said polymer.

Advantageously, the compositions comprising or consisting of the units A and B, the sum of the molar contents of A+B being equal to 100%, defined above, also comprise a unit C in a molar content ranging up to 25%, relative to all of the units of said polymer.

Advantageously, the compositions comprising or consisting of the units A and B, the sum of the molar contents of A+B being equal to 100%, defined above, also comprise a unit C in a molar content ranging up to 20%, relative to all of the units of said polymer.

Advantageously, the compositions comprising or consisting of the units A and B, the sum of the molar contents of A+B being equal to 100%, defined above, also comprise a unit C in a molar content ranging up to 15%, relative to all of the units of said polymer.

According to a first preferred option of the composition according to the invention described above, said composition has a unit B with x' defined according to option B1 described above, in particular with MPMD being a more preferred diamine for said unit B. The unit A remains as defined above, i.e. x.T, with x a $C_4$ to $C_{18}$, preferably $C_9$, $C_{10}$, $C_{11}$ or $C_{12}$, linear aliphatic diamine.

According to a second preferred option of said composition, it has a unit B where x' is MXD according to option B2 defined above. The unit A remains as defined for the first option mentioned. This second option constitutes, together with the first mentioned above, the options that are the most preferred of the invention and in particular this second option is the most preferred of the invention.

A third preferred option is that where B is defined according to option B1 or B2 or B3 as defined above and with the presence of a unit C as defined above as a replacement for B and up to 25 mol %, preferably up to 20 mol %, more preferentially up to 15 mol %, and in particular with B being defined according to the first or second option as defined above.

Advantageously, the compositions comprising or consisting of the units A and B, the sum of the molar contents of A+B being equal to 100%, defined above, also comprise a unit C as partial replacement for B and in a molar content ranging up to 25%, relative to said unit B.

Advantageously, the compositions comprising or consisting of the units A and B, the sum of the molar contents of A+B being equal to 100%, defined above, also comprise a unit C as partial replacement for B and in a molar content ranging up to 20%, relative to said unit B.

Advantageously, the compositions comprising or consisting of the units A and B, the sum of the molar contents of A+B being equal to 100%, defined above, also comprise a unit C as partial replacement for B and in a molar content ranging up to 15%, relative to said unit B.

Even more preferentially, said polyamide composition is based on the units A and B selected as follows:

for the unit A which is 6T, said unit B is selected from: 9T, 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 20% to 45%, for the unit A which is 9T, said unit B is selected from: 6T, 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%, for the unit A which is 10T, said unit B is selected from: 6T, 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferentially MPMD.T or MXD.T, with a molar content of B ranging from 25% to 45%, for the unit A which is 11T, said unit B is selected from: 6T, 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%, for the unit A which is 12T, said unit B is selected from: 6T, 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

According to this selection, a first more particular composition of the invention can be defined with the unit A being a unit 6T and the unit B being selected from: 9T, 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 20% to 45%.

A second particular composition corresponds to a unit A which is a unit 9T, the unit B being selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%. A third particular composition corresponds to a unit A which is a unit 10T, the unit B being selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferentially MPMD.T or MXD.T, with a molar content of B ranging from 25% to 45%. A fourth particular composition corresponds to a unit A which is a unit 11T, the unit B being selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%. Finally, another particular composition corresponds to a unit A which is a unit 12T, the unit B being selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

According to a preferred fifth option, the unit A remains as defined above, i.e. x.T, with x a linear aliphatic $C_4$ to $C_{18}$, preferably $C_6$, $C_9$, $C_{10}$, $C_{11}$ or $C_{12}$, amine, the unit B corresponds to x'.T with x' being B3) a linear aliphatic $C_4$ to $C_{18}$ diamine and the unit C is present and in particular chosen from $C_6$ to $C_{12}$, preferably $C_6$, $C_{11}$ and $C_{12}$, lactams or amino acids, or mixtures thereof, or the units resulting from the reaction of a linear aliphatic $C_6$ to $C_{18}$, preferably $C_6$ to $C_{12}$ diacid and of a linear aliphatic $C_6$ to $C_{18}$, preferably $C_6$ to $C_{12}$, diamine and preferably with the units A and B being respectively based on the diamines x and x' as defined above.

Preferably, the unit C, in this fifth option, is in a molar content of less than 40%, in particular less than 30%, in particular less than 20%, relative to the total molar content of the polyamide as defined according to the invention.

Advantageously, one of the preferred compounds of this fourth option is 10.T/6.T/11.

Said composition comprises or consists of a polyamide polymer resulting from the polymerization of the reaction product of a1) at least one prepolymer of said polyamide polymer as already defined above with this prepolymer bearing n identical end reactive functions $X_1$, chosen from: —$NH_2$ (amine), —$CO_2H$ (carboxy) and —OH (hydroxyl), preferably —$NH_2$ (amine) and —$CO_2H$ (carboxy), with n being 1 to 3, preferably from 1 to 2, more preferentially 1 or 2, more particularly 2, with a2) at least one chain extender $Y_1$-A'-$Y_1$, with A' being a hydrocarbon-based biradical of non-polymeric structure (neither polymer nor oligomer nor prepolymer), bearing 2 identical end reactive functions $Y_1$, reactive by polyaddition (without elimination of reaction by-product) with at least one function $X_1$ of said prepolymer a1), preferably having a molecular weight of less than 500 and more preferentially less than 400, in particular, $Y_1$ is chosen from: oxazine, oxazoline, oxazolinone, oxazinone, imidazoline, epoxy, isocyanate, maleimide, cyclic anhydride, in particular oxazine, oxazoline, oxazolinone, oxazinone, imidazoline, epoxy, maleimide, cyclic anhydride, and preferentially $X_1$ is $CO_2H$ and $Y_1$ is chosen from an epoxy and an oxazoline.

$NH_2$ (amine) signifies a primary and secondary amine.

As suitable examples of extenders a2) as a function of the functions $X_1$ borne by said semicrystalline polyamide prepolymer a1), mention may be made of the following:

when $X_1$ is $NH_2$ or OH, preferably $NH_2$:

either the chain extender $Y_1$-A'-$Y_1$ corresponds to $Y_1$ chosen from the groups: maleimide, isocyanate which is optionally blocked, oxazinone and oxazolinone, and cyclic anhydride, preferably oxazinone and oxazolinone, in particular maleimide, oxazinone and oxazolinone, and cyclic anhydride, preferably oxazinone and oxazolinone and A' is a carbon-based spacer or a carbon-based radical bearing the reactive functions or groups $Y_1$, chosen from:

a covalent bond between two functions (groups) Y in the case where $Y_1$=oxazinone and oxazolinone or an aliphatic hydrocarbon-based chain or an aromatic and/or cycloaliphatic hydrocarbon-based chain, the latter two comprising at least one optionally substituted ring of 5 or 6 carbon atoms, with optionally said aliphatic hydrocarbon-based chain optionally having a molecular weight of 14 to 200 g·mol$^{-1}$ or the chain extender $Y_1$-A'-$Y_1$ corresponds to Y which is a caprolactam group and to A' which can be a carbonyl radical such as carbonyl biscaprolactam or to A' which can be a terephthaloyl or an isophthaloyl, or said chain extender $Y_1$-A'-$Y_1$ bears a cyclic anhydride group Y, and preferably this extender is chosen from a cycloaliphatic and/or aromatic carboxylic dianhydride and more preferentially it is chosen from: ethylenetetracarboxylic dianhydride, pyromellitic dianhydride, 3,3',4,4'-biphenyltetracarboxylic dianhydride, 1,4,5,8-naphtalenetetracarboxylic dianhydride, perylenetetracarboxylic dianhydride, 3,3',4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfonetetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride, or mixtures thereof and when $X_1$ is COOH:
said chain extender $Y_1$-A'-$Y_1$ corresponds to:
$Y_1$ chosen from the groups: oxazoline, oxazine, imidazoline, aziridine, such as 1,1'-iso- or terephthaloyl-bis(2-methylaziridine) or epoxy,
A' being a carbon-based spacer (radical) as defined above.

More particularly, when, in said extender $Y_1$-A'-$Y_1$, said function $Y_1$ is chosen from oxazinone, oxazolinone, oxazine, oxazoline or imidazoline, in particular oxazoline, in this case, in the chain extender represented by $Y_1$-A'-$Y_1$, A' can represent an alkylene such as —$(CH_2)_m$— with m ranging from 1 to 14 and preferably from 2 to 10 or A' can represent a cycloalkylene and/or an arylene which is substituted (alkyl) or unsubstituted, for instance benzenic arylenes, such as o-, m- or p-phenylenes, or naphthalenic arylenes, and preferably A' is an arylene and/or a cycloalkylene.

In the case where $Y_1$ is an epoxy, the chain extender can be chosen from bisphenol A diglycidyl ether (DGEBA), and its (cycloaliphatic) hydrogenated derivative bisphenol F diglycidyl ether, tetrabromo bisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether of Mn<500, polypropylene glycol diglycidyl ether of Mn<500, polytetramethylene glycol diglycidyl ether of Mn<500, resorcinol diglycidyl ether, neopentylglycol diglycidyl ether, bisphenol A polyethylene glycol diglycidyl ether of Mn<500, bisphenol A polypropylene glycol diglycidyl ether of Mn<500, diglycidyl esters of a dicarboxylic acid, such as terephthalic acid glycidyl ester, or epoxidized diolefins (dienes) or fatty acids with a double epoxidized ethylenic unsaturation, diglycidyl 1,2-cyclohexanedicarboxylate, and mixtures thereof.

In the case of carbonyl- or terephthaloyl- or isophthaloyl-biscaprolactam as chain extender $Y_1$-A'-$Y_1$, the preferred conditions avoid the elimination of by-product, such as caprolactam during said polymerization and processing in the molten state.

In the optional case mentioned above where $Y_1$ represents a blocked isocyanate function, this blocking can be obtained using agents for blocking the isocyanate function, for instance epsilon-caprolactam, methyl ethyl ketoxime, dimethylpyrazole, or diethyl malonate.

Likewise, in the case where the extender is a dianhydride which reacts with a prepolymer $P(X_1)n$ where $X_1$=$NH_2$, the preferred conditions avoid any formation of an imide ring during the polymerization and during the processing in the molten state.

For $X_1$=OH or $NH_2$, the group $Y_1$ is preferably chosen from: isocyanate (nonblocked), oxazinone and oxazolinone, more preferentially oxazinone and oxazolinone, with, as spacer (radical), A' which is as defined above.

As examples of chain extenders bearing oxazoline or oxazine reactive functions Y that are suitable for the implementation of the invention, reference may be made to those described under references "A", "B", "C" and "D" on page 7 of application EP 0 581 642, and also to the processes for preparing same and the modes of reaction thereof which are disclosed therein. "A" in this document is bisoxazoline, "B" bisoxazine, "C" 1,3 phenylene bisoxazoline and "D" 1,4-phenylene bisoxazoline.

By way of example, in the case where $X_1$=$CO_2H$ and the chain extender $Y_1$-A'-$Y_1$ is 1,4-phenylene bisoxazoline, the reaction product obtained has at least one recurring unit having the following structure:

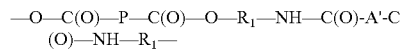

in which:
P is an acid-terminated polyamide HO—C(O)—P—C(O)—OH obtained from the amide units (A), (B) or (C),
$R_1$ is $(CH_2)_2$, and
A' is a phenyl.

As examples of chain extenders bearing imidazoline reactive functions Y that are suitable for the implementation of the invention, reference may be made to those described ("A" to "F") on pages 7 to 8 and table 1 on page 10 of application EP 0 739 924, and also to the processes for preparing same and the modes of reaction thereof which are disclosed therein.

As examples of chain extenders with a reactive function $Y_1$=oxazinone or oxazolinone which are suitable for the implementation of the invention, reference may be made to those described under references "A" to "D" on pages 7 to 8 of application EP 0 581 641, and also to the processes for preparing same and the modes of reaction thereof which are disclosed therein.

As examples of oxazinone (6-atom ring) and oxazolinone (5-atom ring) groups $Y_1$ which are suitable, mention may be made of the groups $Y_1$ derived from: benzoxazinone, from oxazinone or from oxazolinone, with, as spacer, A' which can be a single covalent bond with respective corresponding extenders being: bis(benzoxazinone), bisoxazinone and bisoxazolinone.

A' may also be a $C_1$ to $C_{14}$, preferably $C_2$ to $C_{10}$, alkylene, but preferably A' is an arylene and more particularly it may be a phenylene (substituted with $Y_1$ in positions 1,2 or 1,3 or 1,4) or a naphthalene radical (disubstituted with $Y_1$) or a phthaloyl (iso- or terephthaloyl) or A' may be a cycloalkylene.

For the functions $Y_1$ such as oxazine (6-membered ring), oxazoline (5-membered ring) and imidazoline (5-membered ring), the radical A' may be as described above with A' possibly being a single covalent bond and with the respective corresponding extenders being: bisoxazine, bisoxazoline and bisimidazoline. A' may also be a $C_1$ to $C_{14}$, preferably $C_2$ to $C_{10}$, alkylene. The radical A' is preferably an arylene and more particularly it may be a phenylene (substituted with $Y_1$ in positions 1,2 or 1,3 or 1,4) or a naphthalene radical (disubstituted with $Y_1$) or a phthaloyl (iso- or terephthaloyl) or A' may be a cycloalkylene.

In the case where $Y_1$=aziridine (3-atom nitrogenous heterocycle equivalent to ethylene oxide with replacement of the ether —O— with —NH—), the radical A' may be phthaloyl (1,1-iso- or tere-phthaloyl) with, as an example of an extender of this type, 1,1' isophtaloylbis(2-methylaziridine).

The presence of a catalyst of the reaction between said prepolymer P(X)n and said extender $Y_1$-A'-$Y_1$ in a content ranging from 0.001% to 2%, preferably from 0.01% to 0.5%, relative to the total weight of the two co-reactants mentioned, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification as described in EP 0 425 341, page 9, lines 1 to 7.

According to a more particular case of the choice of said extender, A' can represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthalenylenes). Preferably, A' represents an arylene which may be substituted or unsubstituted benzenic or naphthalenic.

As already specified, said chain extender (a2) has a non-polymeric structure and preferably a molecular weight of less than 500, more preferentially less than 400.

Said reactive prepolymers of said composition, mentioned above, have a number-average molecular weight Mn ranging from 500 to 10 000, preferably from 1000 to 6000, determined in particular by calculation on the basis of the content of end functions, determined by potentiometric titration in solution, and the functionality of said prepolymers. The weights Mn can also be determined by size exclusion chromatography or by NMR.

The content of said extender in said polyamide polymer ranges from 1% to 20%, in particular from 5% to 20%, particularly from 10% to 20%.

In the case of the reactive compositions of the invention according to definition a), said reactive prepolymers are prepared by conventional polycondensation reaction between the diamine and corresponding diacid components and optionally amino acids or lactams, while respecting the nature and proportions of the units A and B and optionally C according to the invention. The prepolymers bearing amine and carboxy functions $X_1$' and $Y_1$' on the same chain can be obtained, for example, by adding a combination of monomers (amino acid, diamine, diacid) having in total an equal amount of amine and carboxy units. Another route for obtaining these prepolymers bearing a function $X_1$' and a $Y_1$' is, for example, by combining a prepolymer bearing 2 identical functions $X_1$'=amine, with a diacid prepolymer bearing $Y_1$': carboxy, with an overall molar content of acid functions equal to that of the starting amine functions $X_1$'.

To obtain prepolymers functionalized with identical (amine or carboxy) functions on the same chain, it is sufficient to have an excess of diamine (or of overall amine functions) to have amine end functions or an excess of diacid (or of overall carboxy functions) to have carboxy end functions.

In the case of a prepolymer P($X_1$)n with n identical functions $X_1$, the functionality 1 can be obtained in the presence of a blocking mono functional component (monoacid or monoamine depending on the nature of $X_1$=amine or carboxy).

A functionality n=2 can be obtained from bifunctional components: diamines and diacids with excess of one to fix $X_1$ depending on this excess.

For n=3 for example, for a prepolymer P($X_1$)n, the presence of a trifunctional component is necessary, for example the presence of a triamine (one mol per prepolymer chain) with a diamine in the reaction with a diacid. The preferred functionality for P($X_1$)n is n=2.

Said polyamide polymer is derived from a reactive polyamide prepolymer comprising a chain extender by polymerization of the reactive precursor composition, this reactive prepolymer having an Mn at least two times lower than that of said polyamide polymer. The number-average molecular weight Mn of said polyamide polymer of said composition is preferably in a range of from 10 000 to 40 000, preferably from 12 000 to 30 000, determined in particular by calculation on the basis of the content of end functions, determined by potentiometric titration in solution, and the functionality of said prepolymers.

According to one advantageous embodiment, said composition also has an average molecular weight which can be modulated according to the temperature to which it is subjected.

According to one advantageous embodiment, the composition of the invention defined above comprises or consists of a polyamide polymer derived from a prepolymer to which has been added a chain extender $Y_1$-A'-$Y_1$ which is chosen from phenylene-bisoxazolines, preferably 1,3-phenylene-bis (2-oxazoline) or 1,4-phenylene-bis(2-oxazoline) (PBO).

The term "which can be modulated" signifies in this case that the average molecular weight of the polyamide polymer of the composition is variable as a function of the temperature to which said composition is subjected.

In other words, a polyamide polymer with a chain extender of PBO type (PA-PBO-PA) having an average molecular weight $Mn_1$, when it is prepared at a temperature $T_1$ greater than or equal to $T_m$ or $T_g$, has an average molecular weight $Mn_2$, with $Mn_2 \le Mn_1$, if this same PA-PBO-PA is this time subjected to a temperature $T_2$, $T_2$ being greater than or equal to Tm, and $T_2 \ge T_1$ and conversely, $Mn_2 \ge Mn_1$, if $T_2 \le T_1$.

Consequently, the inventors have found that not only can the melt viscosity of the composition be modulated, but also the average molecular weight of said polyamide polymer thus provides the advantage of being able to obtain compositions with a viscosity and/or an average molecular weight of the polyamide polymer of said composition which can be modulated, thus allowing varied uses for extrusion, injection-molding or molding and varied applications of said composition.

The composition according to the invention may comprise fillers other than reinforcing fibers and additives.

Among the suitable fillers, mention may for example be made of: inorganic or organic fillers: carbon black, carbon nanotubes (CNTs), carbon nanofibrils, glass beads, ground recycled polymers in powder form.

Among the suitable additives, mention may be made of: additives which absorb in the UV or IR range so as to allow welding of the composite obtained, by a laser technology (UV or IR), and heat stabilizers chosen from antioxidants of sterically hindered phenol or sterically hindered amine (HALS) type. The function of these stabilizers is to prevent thermal oxidation and considerable photooxidation and degradation of the polyamide.

The second subject of the invention relates to the reactive polyamide polymer derived from a prepolymer to which a chain extender has been added as defined according to the composition above. This polyamide polymer is by definition one of the essential components of the composition of the thermoplastic composite material of the present invention and is therefore part of the invention as a product linked to the present invention with the same common inventive concept in the face of the same technical problem to be solved.

The polyamide polymer may be in the form of granules or powder.

The third subject of the invention relates to the use of at least one polyamide polymer as defined according to the composition above, for modulating the melt viscosity of a composition comprising said polyamide polymer.

The use of said prepolymer at variable temperatures makes it possible to obtain compositions which have different viscosities.

Advantageously, the use of said polyamide prepolymer makes it possible to modulate the melt viscosity of a composition comprising said polyamide polymer and the average molecular weight of said polyamide polymer. Advantageously, said polyamide prepolymer comprises a chain extender $Y_1$-A'-$Y_1$ which is 1,3-phenylene-bis(2-oxazoline) or 1,4-phenylene-bis(2-oxazoline).

The third subject also relates to the use of a composition as defined above, for extrusion, injection-molding or molding for the manufacture of mechanical or structural parts based on said composite material, and in particular for easier impregnation of reinforcing fibers for the manufacture of composite.

Advantageously, said mechanical or structural parts of said composite material concern applications in the motor vehicle, electrical or electronics, railway, marine (maritime) and wind power fields, the photovoltaic field, the solar energy field, including solar panels and components of solar power stations, the sport field, the aeronautical and aerospace field, and the road transport (regarding trucks), construction, civil engineering, panel and leisure fields.

Advantageously, said parts for applications in the motor vehicle industry are parts under an engine hood for transporting fluid, in particular in air intake devices, cooling devices (cooling for example by air, cooling liquid, etc.), and devices for transporting or transferring fuels or fluids (such as oil, water, etc.).

Advantageously, said mechanical or structural parts for applications in the electrical or electronics industry are electrical and electronic goods, such as encapsulated solenoids, pumps, telephones, computers, printers, fax machines, modems, monitors, remote controls, cameras, circuit breakers, electrical cable jackets, optical fibers, switches or multimedia systems. These elements of electrical and electronic goods cover not only the structural parts of such goods (casings, housings, etc.), but also their optional associated accessories (earphones, connecting elements, cables, etc.).

More particularly, three more preferred applications can be distinguished according to the temperature at which said parts made of composite material according to the invention are used:
  in the wind power industry, with a Tg of said thermoplastic matrix polyamide of at least 90° C.
  in the motor vehicle industry, with a Tg of said polyamide of at least 100° C.
  in the aeronautical industry, with a Tg of said polyamide of at least 120° C.

This means that, for a Tg of at least 100° C., it can have two possible applications: motor vehicle industry and wind power industry, and if the Tg is at least 120° C., it can have an application in the wind power and motor vehicle industries, in addition to the aeronautical industry.

The use of the composition of the invention therefore makes it possible to prepare various objects such as a tube, pipe, profiled part, textile fiber, plate, sheet or film, by extrusion, or objects for the applications defined above, by injection-molding or molding.

The fourth subject of the invention relates to a process for manufacturing a thermoplastic composite material, in particular a mechanical part or a structural part based on said material, having a composition as defined according to the invention as set out above, which process comprises at least one step of molding or of processing at least one composition as defined above according to the invention, at a temperature T which makes it possible to obtain a desired viscosity η.

More particularly, said process can comprise the following steps:
i) melt impregnation of a fibrous reinforcement with a composition as defined above according to the invention but not comprising said fibrous reinforcement in an open or closed mold or outside the mold, in order to obtain a composition as defined according to the invention comprising, in addition, an impregnated fibrous reinforcement,
ii) processing or molding of said composition of step i), so as to form the final composite part in a mold or with another processing system.

Advantageously, the polyamide polymer of the composition of the invention has a glass transition temperature Tg of less than or equal to 75° C. and a melting temperature from 150° C. to less than 250° C. or a Tg of greater than 75° C., in particular of at least 80° C. and preferably of from 100 to 200° C., more preferentially from 110 to 200° C., in particular from 110° C. to less than 180° C., said process comprising:
i) a step of bulk melt impregnation with at least one composition as defined above, in particular having a viscosity at the bulk melt impregnation temperature not exceeding 200 Pa·s, preferably not exceeding 150 Pa·s,
ii) a step of cooling and obtaining a fibrous pre-impregnate,
iii) a step of processing and final forming of said composite material.

In said process according to the invention, said processing can preferably be carried out according to an RTM, S-RIM, injection-compression molding or pultrusion process or by infusion molding, in particular in the case of a composition. Advantageously, said processing step is carried out by thermocompression of pre-impregnates under reduced pressure.

The reinforcing fibers or fibrous reinforcement may be an assembly of fibers, preferably of long fibers, i.e. fibers having an aspect ratio defined by the ratio of length to diameter of the fiber, which means that these fibers have a circular cross-section, greater than 1000, preferably greater than 2000. In this assembly, the fibers may be continuous, or in unidirectional (UD) or multidirectional (2D, 3D) reinforcement form. In particular, they may be in the form of fabrics, sheets, strips or braids and may also be cut, for example in the form of nonwovens (mats) or in the form of felts.

These reinforcing fibers may be chosen from:
  mineral fibers, said fibers having high melting temperatures Tm' above the melting temperature Tm of said semicrystalline polyamide of the invention and above the polymerization and/or processing temperature;

polymeric fibers or polymer fibers having a melting temperature Tm', or if not Tm', a glass transition temperature Tg', above the polymerization temperature or above the melting temperature Tm of said semicrystalline polyamide constituting said matrix of the composite and above the processing temperature;

or mixtures of the abovementioned fibers.

As mineral fibers suitable for the invention, mention may be made of carbon fibers, which includes fibers of nanotubes or carbon nanotubes (CNTs), carbon nanofibers or graphenes; silica fibers such as glass fibers, in particular of E, R or S2 type; boron fibers; ceramic fibers, in particular silicon carbide fibers, boron carbide fibers, boron carbonitride fibers, silicon nitride fibers, boron nitride fibers, basalt fibers; fibers or filaments based on metals and/or alloys thereof, fibers of metal oxides, in particular of alumina ($Al_2O_3$); metallized fibers such as metallized glass fibers and metallized carbon fibers, or mixtures of the abovementioned fibers.

More particularly, these fibers may be chosen as follows:
the mineral fibers may be chosen from: carbon fibers, carbon nanotube fibers, glass fibers, in particular of E, R or S2 type; boron fibers, ceramic fibers, in particular silicon carbide fibers, boron carbide fibers, boron carbonitride fibers, silicon nitride fibers, boron nitride fibers, basalt fibers, fibers or filaments based on metals and/or alloys thereof, fibers based on metal oxides such as $Al_2O_3$, metallized fibers such as metallized glass fibers and metallized carbon fibers, or mixtures of the abovementioned fibers, and the polymer fibers or polymeric fibers, under the abovementioned condition, are chosen from:
thermosetting polymer fibers and more particularly those chosen from: unsaturated polyesters, epoxy resins, vinyl esters, phenolic resins, polyurethanes, cyanoacrylates and polyimides, such as bismaleimide resins, or aminoplasts resulting from the reaction of an amine such as melamine with an aldehyde such as glyoxal or formaldehyde, thermoplastic polymer fibers, more particularly chosen from: polyethylene terephthalate (PET), polybutylene terephthalate (PBT), high-density polyolefins such as polyethylene (PET), polypropylene (PP) and PET/PP, PVOH (polyvinyl alcohol) copolymers, fibers of polyamides corresponding to one of the formulae: 6, 11, 12, 6.10, 6.12, 6.6 and 4.6, fibers of aramids (such as Kevlar®) and aromatic polyamides such as those corresponding to one of the formulae: PPD.T, MPD.I, PAA and PPA, with PPD and MPD being respectively p- et m-phenylenediamine, PAA being polyarylamides and PPA being polyphthalamides, fibers of polyamide block copolymers such as polyamide/polyether, fibers of polyaryl ethers ketones (PAEKs) such as polyether ether ketone (PEEK), polyether ketone ketone (PEKK) or polyether ketone ether ketone ketone (PEKEKK).

The preferred reinforcing fibers are long fibers (with a circular cross-section) chosen from: carbon fibers, including those which are metallized, glass fibers, including those which are metallized, of E, R, S2 type, fibers of aramids (such as Kevlar®) or aromatic polyamides, polyaryl ether ketone (PAEK) fibers, such as polyether ether ketone (PEEK) fibers, polyether ketone ketone (PEKK) fibers, polyether ketone ether ketone ketone (PEKEKK) fibers, or mixtures thereof.

The fibers that are more particularly preferred are chosen from: glass fibers, carbon fibers, ceramic fibers and aramid fibers (such as Kevlar®), or mixtures thereof. These fibers have a circular cross-section.

Said fibers can represent contents of from 40% to 70% by volume and preferably from 50% to 65% by volume of said composite material.

The fiber assembly may be random (mat), unidirectional (UD) or multidirectional (2D, 3D, or the like). The grammage thereof, i.e. the weight thereof per square meter, can range from 100 to 1000 $g/m^2$, preferably from 200 to 700 $g/m^2$. The fibers may be in woven or nonwoven form, in particular in the form of reinforcing cloths and fabrics. They can in particular be assembled and linked in the form of a preform already having the shape of the final part. As suitable linking agent, use may be made of a composition according to a) or b) and, failing this, a linking agent compatible with said composition (composition a) or b)).

The present invention also covers a thermoplastic composite material resulting from the use of at least one composition for thermoplastic composite material as defined above according to the present invention.

Lastly, the invention relates to a mechanical part or a structural part made of thermoplastic composite material, which results from the use of at least one composition of the invention as defined above or from the use of a semicrystalline polyamide polymer as defined according to the invention or of a thermoplastic composite material as defined above, or which part is obtained by means of a process as defined above according to the invention.

More particularly, said structural part is a motor vehicle part post-treated by cataphoresis, in particular with a Tg of at least 90° C.

According to another option, it is a part for wind power, in particular with a Tg of at least 100° C.

According to a third particular option, it is a part for the aeronautical industry, in particular with a Tg of at least 120° C.

Methods for Determining the Characteristics Mentioned

The melt viscosity of the prepolymer or of the precursor composition is measured according to the reference manual of the constructor of the measuring instrument used, which is a Physica MCR301 Rheometer, under nitrogen flushing at the temperature given under a shear of 100 s$^{-1}$, between two parallel planes 50 mm in diameter.

The Mn of the thermoplastic prepolymer or polymer is determined by potentiometry, size exclusion chromatography or NMR.

The measurement of the intrinsic or inherent viscosity is carried out in m-cresol. The method is well known to those skilled in the art. Standard ISO 307:2007 is followed, but with the solvent being changed (use of m-cresol instead of sulfuric acid), the temperature being changed (20° C.) and the concentration being changed (0.5% by weight).

The glass transition temperature Tg of the thermoplastic polymers used is measured using a differential scanning calorimeter (DSC), after a second heating pass, according to standard ISO 11357-2:2013. The heating and cooling rate is 20° C./min.

The melting temperature Tm and the crystallization temperature Tc are measured by DSC, after a first heating, according to standard ISO 11357-3:2013. The heating and cooling rate is 20° C./min.

The enthalpy of crystallization of said matrix polymer is measured by differential scanning calorimetry (DSC) according to standard ISO 11357-3:2013.

It is observed that the viscosity of $\eta'_2$ of $PA_1$-$All_1$-$PA_1$ is lower than that ($\eta_2$) of $PA_1$ for the same temperature $T_2$, greater than $T_1$, and that the viscosity of $\eta'_3$ of $PA_1$-$All_1$-$PA_1$ is lower than that ($\eta_3$) of $PA_1$ for the same temperature $T_3$ greater than $T_1$ and that the ratio $\eta'_3/\eta_3 < \eta'_2/\eta_2$.

Figure 1:
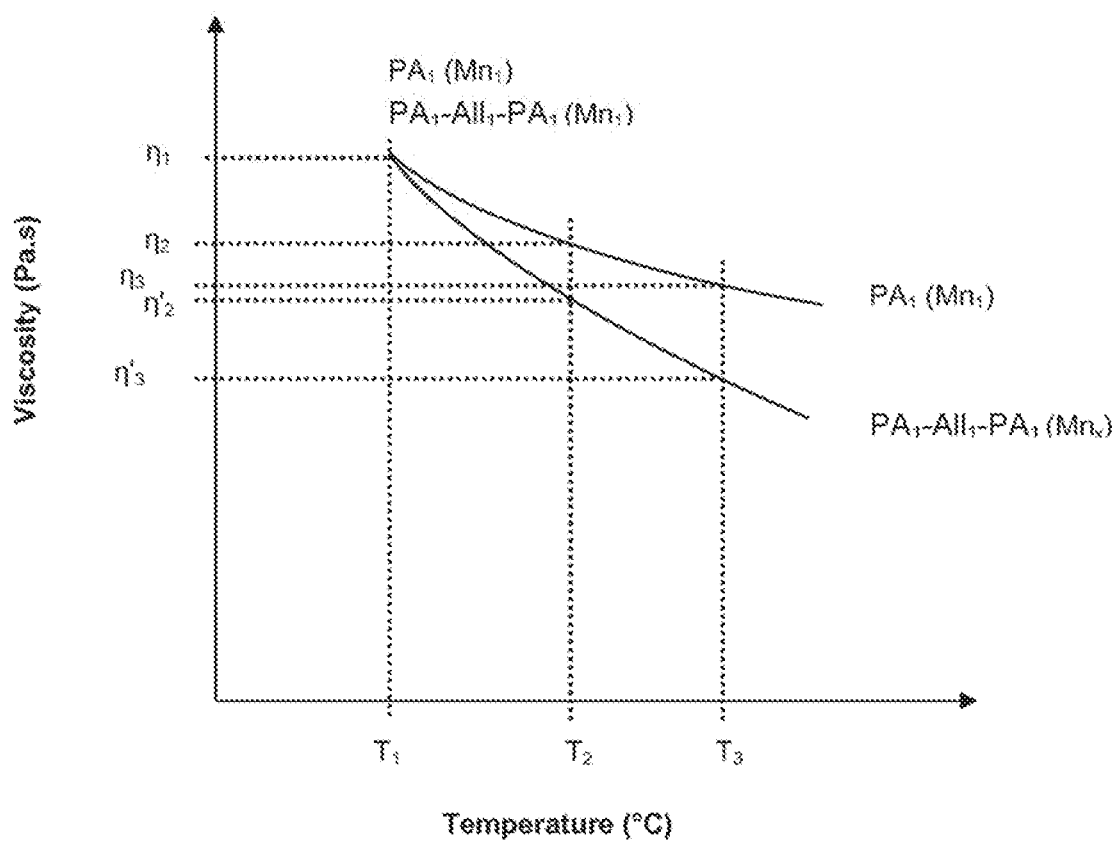
FIG. 1 presents the differences in the viscosities of a $PA_1$ and a $PA_1$-$All_1$-$PA_1$ obtained respectively at $T_2$ and $T_3$ starting from a $PA_1$ and a $PA_1$-$All_1$-$PA_1$ of the same average molecular weight $Mn_1$ having and exhibiting the same viscosity $\eta_1$ at the temperature $T_1$ greater than or equal to $T_m$ or $T_g$.
Figure 2:
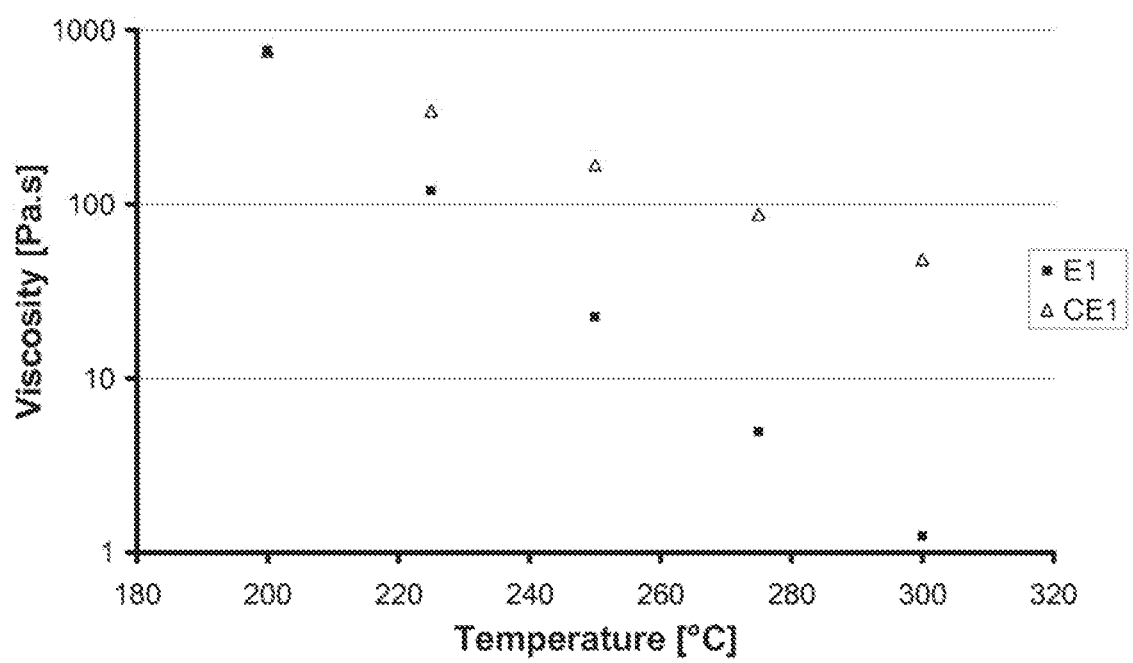

FIG. 2 presents the change in viscosity with the temperature of example E according to the invention and of comparative example CE 1. It is observed that the viscosity of the polymer according to the invention is lower than that of the comparative polymer for $T>T_1$.

EXAMPLES

A—Preparation of a Polyamide Polymer by Chain Extension of a Reactive Prepolymer (or Oligomer)

A-1 Preparation of the Reactive Prepolymer $P(X_1)n$

This procedure is representative of all the types of polyamide of the invention.

5 kg of the following starting materials are placed in a 14-liter autoclave reactor:
500 g of water,
the diamines,
the amino acids or lactams,
the diacids,
35 g of sodium hypophosphite in solution,
0.1 g of a Wacker AK1000 antifoam (the company Wacker Silicones).

The nature and molar ratios of the molecular units and structures of the reactive prepolymer polyamides (by reference test) are given in table 1 below.

The closed reactor is purged of its residual oxygen and then heated to a temperature of 230° C. of the material. After stirring for 30 minutes under these conditions, the pressurized vapor that has formed in the reactor is gradually reduced in pressure over the course of 60 minutes, while at the same time gradually increasing the temperature of the material such that it becomes established at a minimum of Tm+10° C. at atmospheric pressure for the semicrystalline polymers of Tm>230° C., or 250° C. for the other polymers.

The oligomer (prepolymer) is then emptied out by the bottom valve and then cooled in a waterbath and then ground.

The characteristics are presented in table 1 below.

TABLE 1

Characteristics of the prepolymers prepared

| Ref | Molecular structure and molar composition | Monomers used | $X_1$ | Tm (° C.) | Tg (° C.) | Tc (° C.) | ΔH (J/g) | Acid number meq/kg(*) | Mn potentiometry g/mol |
|---|---|---|---|---|---|---|---|---|---|
| Prepo1 | 11 | Aminoundecanoic acid Adipic acid (1 molecule per chain) | COOH | 178.8 | 43.2 | 155 | 75 | 809 | 2472 |
| Prepo2 | 11/6T/10T (9.1/27.3/63.6) | Aminoundecanoic acid hexamethylenediamine decanediamine terephthalic acid | COOH | 267.8 | 99 | 234.5 | 60 | 740 | 2701 |
| Prepo3 | 6I/10I (30/70) | hexamethylenediamine decanediamine isophthalic acid | COOH | () | 94.5 | () | (**) | 900 | 2222 |
| Prepo4 | MXDT/10T (41.2/58.8) | m-xylylenediamine decanediamine terephthalic acid | COOH | 270.3 | 119.4 | 240.8 | 50.1 | 621 | 3221 |

(*)Milliequivalents per kilogram
(**) Amorphous polymer

A-2 Preparation of the Polyamide Polymer ($PA_1$-$All_1$-$PA_1$) by Chain Extension with an Extender of $Y_1$-$A$-$Y_1$ Type 10 g of the dried and ground above prepolymer are mixed with a stoichiometric amount of 1,3-phenylene-bis(2-oxazoline) (PBO). The stoichiometric amount was determined relative to the molar mass determined by NMR.

The mixture is introduced under nitrogen flushing into a DSM co-rotating conical screw microextruder (15 ml volume) preheated to $T_1$, as defined in the invention, with rotation of the screws at 100 rpm. The mixture is left to recirculate in the microextruder and the increase in viscosity is monitored by measuring the normal force. After approximately 2 minutes, a plateau is reached and the contents of the microextruder are emptied out in the form of a rod. The air-cooled product is formed into granules. The characteristics are presented in table 2 below.

TABLE 2

Analytical characteristics of the polyamides obtained with chain extension ($PA_1$-$All_1$-$PA_1$)

| Ref | Prepolymer | | $T_1$ (° C.) | Tm (° C.) | Tg (° C.) | Tc (° C.) | Δ H (J/g) | Mn 1 (determined by size exclusion chromatography in PMMA equivalent) (g/mol) |
|---|---|---|---|---|---|---|---|---|
| E1 | According to the invention | Prepo1 | 200 | 174.7 | 34 | 142.8 | 57 | 28100 |
| E2 | According to the invention | Prepo2 | 280 | 262.7 | 114 | 224 | 46 | 12600 |
| E3 | According to the invention | Prepo3 | 200 | (*) | 110 | (*) | (*) | 28500 |
| E4 | According to the invention | Prepo4 | 280 | 273 | 135 | 230.5 | 36 | 9900 |

(*) Amorphous polymer

A-3 Preparation of the Comparative Examples $PA_1$

The comparative polyamides free of chain extenders $PA_1$ are synthesized according to a protocol similar to the reactive prepolymers $P(X_1)n$: this procedure is representative of all the types of polyamide of the invention.

The molar mass of the comparative polymer $Mn_1$ is adjusted according to an excess of diamine or diacid, according to the method well known to those skilled in the art.

5 kg of the following starting materials are placed in a 14-liter autoclave reactor:
- 500 g of water,
- the diamines,
- the amino acids or lactams,
- the diacids,
- 35 g of sodium hypophosphite in solution,
- 0.1 g of a Wacker AK1000 antifoam (the company Wacker Silicones).

The nature and molar ratios of the molecular units and structures of the comparative polyamides (by reference test) are given in table 3 below.

The closed reactor is purged of its residual oxygen and then heated to a temperature of 230° C. of the material. After stirring for 30 minutes under these conditions, the pressurized vapor that has formed in the reactor is gradually reduced in pressure over the course of 60 minutes, while at the same time gradually increasing the temperature of the material such that it becomes established at a minimum of Tm+10° C. at atmospheric pressure for the semicrystalline polymers of Tm>230° C., or 250° C. for the other polymers.

The polymer is then emptied out by the bottom valve and then cooled in a waterbath and then ground.

The characteristics are presented in table 3 below.

TABLE 3

Analytical characteristics of the comparative polyamides free of chain extenders $PA_1$

| Ref | | Molecular structure and molar composition | Monomers used | Tm (° C.) | Tg (° C.) | Tc (° C.) | Δ H (J/g) | Mn 1 (determined by size exclusion chromatography in PMMA equivalent) (g/mol) |
|---|---|---|---|---|---|---|---|---|
| CE1 | Comparative | 11 (100) | Aminoundecanoic acid Adipic acid (1 molecule per chain) | 188.5 | 47.3 | 158.4 | 72.4 | 28250 |
| CE2 | Comparative | 11/6T/10T (9.1/27.3/63.6) | Aminoundecanoic acid hexamethylenediamine decanediamine terephthalic acid | 268.5 | 114 | 236 | 58 | 12580 |
| CE3 | Comparative | 6I/10I (30/70) | hexamethylenediamine decanediamine isophthalic acid | (*) | 108.3 | (*) | (*) | 28540 |

TABLE 3-continued

Analytical characteristics of the comparative polyamides free of chain extenders PA₁

| Ref | | Molecular structure and molar composition | Monomers used | Tm (° C.) | Tg (° C.) | Tc (° C.) | Δ H (J/g) | Mn 1 (determined by size exclusion chromatography in PMMA equivalent) (g/mol) |
|---|---|---|---|---|---|---|---|---|
| CE4 | Comparative | MXDT/10T (41.2/58.8) | m-xylylenediamine decanediamine terephthalic acid | 279.2 | 130.7 | 43.6 | 241.4 | 10000 |

(*) Amorphous polymer

A-4 Comparison of the Viscosities of the PAs According to the Invention and the Comparative PAs The viscosities of the polymers according to the invention ($PA_1$-$All_1$-$PA_1$) and of the comparative polyamides free of chain extenders $PA_1$ are reported in tables 4 to 7 below:

TABLE 4

Viscosities of tests E1 and CE1 (PA 11)

| T (° C.) | Viscosity E1 (Pa · s) | Viscosity CE1 (Pa · s) |
|---|---|---|
| 200 | 756.4 | 751.2 |
| 225 | 128.2 | 340.6 |
| 250 | 22.51 | 166.5 |
| 275 | 5.72 | 86.9 |
| 300 | 1.75 | 48 |

These results are represented in FIG. 2.

TABLE 5

Viscosities of tests E2 and CE2 (PA 11/6T/10T)

| T (° C.) | Viscosity E2 (Pa · s) | Viscosity CE2 (Pa · s) |
|---|---|---|
| 280 | 188 | 186 |
| 300 | 49.4 | 120 |

TABLE 6

Viscosities of tests E3 and CE3 (PA 6I/10I)

| T (° C.) | Viscosity E3 (Pa · s) | Viscosity CE3 (Pa · s) |
|---|---|---|
| 200 | 42080 | 42150 |
| 250 | 423 | 12600 |

TABLE 7

Viscosities of tests E4 and CE4 (PA MXDT/10T)

| T (° C.) | Viscosity E4 (Pa · s) | Viscosity CE4 (Pa · s) |
|---|---|---|
| 280 | 187 | 189 |
| 300 | 46.2 | 126 |

The results clearly show that the melt viscosities of the PAs according to the invention are lower than those of the comparative PAs for temperatures $T > T_1$.

The invention claimed is:

1. A composition, comprising at least one polyamide polymer derived from at least one reactive polyamide prepolymer comprising at least one chain extender ($PA_1$-$All_1$-$PA_1$), said polyamide polymer being prepared at a temperature $T_1$ greater than or equal to the temperature $T_m$ or $T_g$ of said polymer, determined respectively according to standards ISO 11357-3 and ISO 11357-2, and having an average molecular weight $Mn_1$, as determined by size exclusion chromatography,
wherein said composition has a melt viscosity which can be modulated according to the temperature to which said composition is subjected,
said temperature being included from $T_2$ to $T_3$, $T_2$ and $T_3$ being greater than $T_1$,
and said melt viscosity $\eta'_2$ or $\eta'_3$ observed respectively at the temperature $T_2$ or $T_3$ being less than the melt viscosity $\eta_2$ or $\eta_3$ of said polyamide polymer, free of chain extender and having the same average molecular weight $Mn_1$ ($PA_1$) observed at the same temperature $T_2$ or $T_3$,
and with:
said composition comprising or consisting of one or more polyamides, including random or block copolyamides which are polymers and which comprise different amide units of formula $A/(B)_r/(C)_s$, selected as follows:
A is a repeating amide unit chosen from lactams or an amino acid of $C_6$-$C_{14}$, an amide unit X.Y in which X represents at least one diamine, said diamine being chosen from a linear or branched aliphatic diamine, a cycloaliphatic diamine and an aromatic diamine or a mixture thereof, and Y represents at least one dicarboxylic acid, said diacid being chosen from:
an aliphatic diacid, a cycloaliphatic diacid and an aromatic diacid,
said diamine and said diacid comprising from 4 to 36 carbon atoms;
B and C are repeating amide units different than A, optionally present depending on the value of r and s, r=0 or 1, s=0 or 1, said amides units B and C being chosen from the same constituents as for A, on the condition that when r and s=1, then B and C are different,
the sum of the units A+B+C being equal to 100% by weight, and
said composition comprising or consisting of a polyamide polymer resulting from the polymerization of the reaction product of:
a1) at least one prepolymer of said thermoplastic polyamide polymer, bearing n reactive end functions $X_1$, chosen from $NH_2$ and $—CO_2H$ with n being 1 to 3, with a2) at least one chain extender $Y_1$-A'-$Y_1$, with A' being a hydrocarbon-based biradical of non-polymeric structure, bearing 2 identical end reactive functions $Y_1$, reactive by polyaddition with at least one function X of said prepolymer a1), $Y_1$ is chosen from: oxazine, oxazoline, oxazolinone, oxazinone, imidazoline, epoxy, maleimide, and cyclic anhydride, and said composition being free of reinforcing fibers and also of polymeric chain extender, wherein:

A is present in a molar content ranging from 55% to 95%, chosen from x.T units, wherein x is a linear aliphatic $C_4$ to $C_{18}$ diamine, and wherein T is terephthalic acid, and B is present in a molar content ranging from 5% to 45%, depending on the Tm of the polyamide based on unit A, and B is chosen from an aliphatic repeating unit obtained from a lactam or an amino acid, and C is an optional amide unit different than A and B.

2. The composition of claim 1, wherein the ratio of melt viscosity $\eta'_3/\eta_3$ observed at a temperature $T_3$ is lower than the ratio of melt viscosity $\eta'_2/\eta_2$ observed at a temperature $T_2$, $T_3 \geq T_2+10°$ C.

3. The composition of claim 1, wherein the ratio of melt viscosity $\eta'_3/\eta_3$ observed at a temperature $T_3$ is higher than the ratio of melt viscosity $\eta'_2/\eta_2$ observed at a temperature $T_2$, $T_3 \leq T_2-10°$ C.

4. The composition of claim 1, wherein C is present in a molar content ranging up to 30% relative to the total molar content of the polyamide polymer.

5. The composition of claim 1, wherein A is present with a molar content ranging from 55% to 80%, relative to all of the units of said polymer.

6. The composition of claim 1, wherein A and B are selected as follows:

when A is 6T, B is selected from: 9T, 10T, 11T, 12T, 13T, 14T, 15T, 16T, 17T and 18T, MPMD.T and MXD.T, with a molar content of B ranging from 20% to 45%, when A is 9T, B is selected from: 6T, 10T, 11T, 12T, 13T, 14T, 15T, 16T, 17T and 18T, MPMD.T and MXD.T, with a molar content of B ranging from 30% to 45%, when A is 10T, B is selected from: 6T, 9T, 11T, 12T, 13T, 14T, 15T, 16T, 17T and 18T, MPMD.T and MXD.T, with a molar content of B ranging from 25% to 45%, when A is 11T, B is selected from: 6T, 9T, 10T, 12T, 13T, 14T, 15T, 16T, 17T and 18T, MPMD.T and MXD.T, with a molar content of B ranging from 20% to 45%, and when A is 12T, B is selected from: 6T, 9T, 10T, 11T, 13T, 14T, 15T, 16T, 17T and 18T, MPMD.T and MXD.T, with a molar content of B ranging from 20% to 45%.

7. The composition of claim 6, wherein A is 6T and B is selected from: 9T, 10T, 11T, 12T, 13T, 14T, 15T, 16T, 17T and 18T, MPMD.T and MXD.T, with a molar content of B ranging from 20% to 45%.

8. The composition of claim 6, wherein A is 9T and B is selected from: 10T, 11T, 12T, 13T, 14T, 15T, 16T, 17T and 18T, MPMD.T and MXD.T, with a molar content of B ranging from 30% to 45%.

9. The composition of claim 6, wherein A is 10T and B is selected from: 9T, 11T, 12T, 13T, 14T, 15T, 16T, 17T and 18T, MPMD.T and MXD.T, with a molar content of B ranging from 25% to 45%.

10. The composition of claim 6, wherein A is 11T and B is selected from: 9T, 10T, 12T, 13T, 14T, 15T, 16T, 17T and 18T, MPMD.T and MXD.T, with a molar content of B ranging from 20% to 45%.

11. The composition of claim 6, wherein A is 12T and B is selected from: 10T, 11T, 13T, 14T, 15T, 16T, 17T and 18T, MPMD.T and MXD.T, with a molar content of B ranging from 20% to 45%.

12. The composition of claim 1, wherein said reactive polyamide prepolymer has a number-average molecular weight Mn ranging from 500 to 10,000.

13. The composition of claim 1, wherein said reactive polyamide polymer has an average molecular weight which can be modulated according to the temperature to which said polyamide polymer is subjected.

14. The composition of claim 1, wherein said chain extender $Y_1$-A'-$Y_1$ is 1,3-phenylene-bis(2-oxazoline) or 1,4-phenylene-bis(2-oxazoline).

* * * * *